United States Patent
Ohashi et al.

(10) Patent No.: US 8,302,351 B2
(45) Date of Patent: Nov. 6, 2012

(54) VIBRATION DAMPER

(75) Inventors: Yoshimitsu Ohashi, Tokyo (JP); Yoshinari Kawai, Kobe (JP); Manabu Hattori, Akashi (JP); Eiji Koutani, Tokyo (JP)

(73) Assignees: Yoshimitsu Ohashi, Tokyo (JP); Fukuvi Chemical Industry Co., Ltd., Fukui (JP); Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 12/663,269

(22) PCT Filed: Jun. 6, 2008

(86) PCT No.: PCT/JP2008/060495
§ 371 (c)(1),
(2), (4) Date: Apr. 26, 2010

(87) PCT Pub. No.: WO2008/149996
PCT Pub. Date: Dec. 11, 2008

(65) Prior Publication Data
US 2010/0218439 A1    Sep. 2, 2010

(30) Foreign Application Priority Data

Jun. 6, 2007 (JP) .................. 2007-150341
Jun. 6, 2007 (JP) .................. 2007-150342
Jun. 3, 2008 (JP) .................. 2008-145903
Jun. 3, 2008 (JP) .................. 2008-145904

(51) Int. Cl.
*E04B 1/98* (2006.01)
*E04B 1/92* (2006.01)
(52) U.S. Cl. .................. 52/167.1; 52/167.3; 52/167.8; 52/167.7; 52/167.4

(58) Field of Classification Search ............. 52/167.1, 52/167.3, 167.4, 167.7, 293.3, 293.1, 299, 52/16
See application file for complete search history.

(56) References Cited

U.S. PATENT DOCUMENTS 5,941,029 A * 8/1999 MacLeod .................. 52/167.1
(Continued)

FOREIGN PATENT DOCUMENTS

JP    2000-160683    6/2000
(Continued)

OTHER PUBLICATIONS

Office Action, Japanese Patent Application No. 2008-149930, dated Sep. 16, 2008 (counterpart of present application).

(Continued)

*Primary Examiner* — Phi Dieu Tran A
(74) *Attorney, Agent, or Firm* — Nixon Peabody LLP

(57) ABSTRACT

A vibration damper comprises a first plate 11 that is fixed to one framework member 51, a second plate 13 that is fixed to another framework member 53, and an elastic material 15 that is filled in the interstices between the first plate 11 and the second plate 13. A first clearance W1 is formed between the another framework member 53 and a first fixing portion 21, and a second clearance W2 is formed between the first framework member 51 and a second fixing portion 29. The first plate 11 is made of a steel plate that is formed directing from the first fixing portion 21 to the second fixing portion 29, and the second plate 13 is made of a steel plate that is formed directing from the second fixing portion 29 to the first fixing portion 21. A space portion 50 constituted by the first clearance W1, the second clearance W2, the first plate 11, and the second plate 13 has a dimension which is at least sufficient for insertion of a joist 57 therein.

6 Claims, 11 Drawing Sheets

U.S. PATENT DOCUMENTS

| | | | | |
|---|---|---|---|---|
| 6,134,850 A | * | 10/2000 | Hui et al. | 52/167.1 |
| 6,612,087 B2 | * | 9/2003 | diGirolamo et al. | 52/712 |
| 7,293,393 B2 | * | 11/2007 | Kelly et al. | 52/665 |
| 7,647,733 B2 | * | 1/2010 | Nakamura et al. | 52/167.1 |

FOREIGN PATENT DOCUMENTS

| | | |
|---|---|---|
| JP | 2001-295506 | 10/2001 |
| JP | 2002-004634 | 1/2002 |
| JP | 2002-235454 | 8/2002 |
| JP | 2006-207290 | 8/2006 |
| JP | 2006-342655 | 12/2006 |
| JP | 2007-023523 | 2/2007 |

OTHER PUBLICATIONS

International Search Report, PCT/JP2008/060495, dated Jul. 8, 2008.

Office Action in Japanese Application No. 2008-149931 mailed Sep. 4, 2012.

* cited by examiner

VIBRATION DAMPER

CROSS REFERENCE TO RELATED APPLICATIONS OR PRIORITY CLAIM

This application is a national phase of International Application No. PCT/JP2008/060495, entitled "EARTHQUAKE DAMPER", which was filed on Jun. 6, 2008, and which claims priority of Japanese Patent Application No. 2007-150341 and Japanese Patent Application No. 2007-150342, filed Jun. 6, 2007; and Japanese Patent Application No. 2008-145903 and Japanese Patent Application No. 2008-145904, filed Jun. 3, 2008, the contents of which are incorporated herein by reference.

DESCRIPTION

Technical Field

The present invention relates to a vibration-damper used in a wooden construction.

Conventionally, a vibration damper composed of two displacable plates and a viscoelastic material filled in the interstices between the plates has been known to be used in an earthquake-resistant reinforcing structure of a wooden-building to perform earthquake-resistant reinforcement of the wooden building simply and at low cost by attaching the viscoelastic damper to a connection joining framework members of the wooden building so as to absorb seismic energy by shear deformation of the viscoelastic material (Patent Reference 1).

Patent Reference 1: Japanese Patent No. 3667123

DISCLOSURE OF INVENTION

Problems to be Solved by the Invention

The conventional damper as described in Patent Reference 1 can be fit to a joint portion (connection) between a column and a beam. However, for example, when a joist is arranged in a vicinity of a joint portion between a column and a ground-sill, it is impossible to attach the damper to the joint portion because of interference of the damper by the joist.

The present invention was carried out based on the consideration of the above-described circumstance and provides a vibration damper that can be securely attached to a joint portion of framework members.

Solutions of the Problems

In order to solve the above-described problems, a first aspect of the present invention is a vibration damper disposed in a vicinity of a joint portion in which framework members of a wooden construction are joined to each other, the damper comprising a first plate that is fixed to a first (one) framework member and projects from the framework member, a second plate that is fixed to a second (another) framework member and projects from the framework member, and an elastic material that is filled in the interstices between the first plate and the second plate, and join the first plate and the second plate. In addition, a first clearance is formed between the second framework member and the first plate, and a second clearance is formed between the first framework member and the second plate. The first plate is made of a steel plate that is formed directing (extending) from the first fixing portion towards the second fixing portion. The second plate is made of a steel plate that is formed directing from the second fixing portion towards the first fixing portion. Further, a space portion constituted (bordered) by the first clearance, the second clearance, the first plate, and the second plate has a dimension which is at least sufficient for inserting a joist therein.

To solve the above-described problems, a second aspect of the present invention is a vibration damper disposed in a vicinity of a joint portion in framework members of a wooden construction are joined to each other, the damper comprising a first plate that is fixed to a first (one) framework member and projects from the framework member, a second plate that is fixed to a second (another) framework member and projects from the framework member, and an elastic material that is filled in the interstices between the first plate and the second plate and join the first plate and the second plate. A first clearance is formed between the second framework member and a first fixing portion by which the first plate is fixed to the first framework member, and a second clearance is formed between the first framework member and a second fixing portion by which the second plate is fixed to the second framework member, wherein a space constituted (bordered) by the first clearance and the second clearance has a dimension which is at least sufficient for inserting a joist therein.

In the above-described case, the first plate and the second plate are preferably constituted of steel plates having the same rectangular shape.

The above-described vibration damper is preferably constituted such that an anchor bolt for joining a ground-sill and a foundation in the vicinity of the joint portion can be arranged in the space portion.

Preferably, in the above-described vibration damper, $H_{eq}$ (equivalent viscous damping coefficient (equivalent damping factor)) of the elastic material satisfies $H_{eq} > 0.24$ under conditions of 0° C. to 40° C., and within a range of $0.125 \leq \gamma$(shear strain)$\leq 3.0$; and a ratio of $G_{eq}$ (equivalent shear modulus) at $\gamma=3$ and at $=1$ satisfies $0.40 \leq \{G_{eq}(\gamma_{=3.0})\}/\{G_{eq}(\gamma_{=1.0})\} < 0.60$. Preferably, the elastic material has a damping capacity (performance) under predetermined temperature conditions such that a rate of change of frequency from a base frequency is within ±50% where the base frequency is within a range of 0.1 to 20 Hz. Preferably, in the above-described elastic material, where normalized by $G_{eq}$ at 20° C., ratio between $G_{eq}(t=0°$ C.$)$ at 0° C. and $G_{eq}(t=20°$ C.$)$ at 20° C. satisfies $G_{eq}(t=0°$ C.$)/G_{eq}(t=20°$ C.$) \leq 2.0$, and ratio between $G_{eq}(t=40°$ C.$)$ at 40° C. and $G_{eq}(t=20°$ C.$)$ at 20° C. satisfies $G_{eq}(t=40°$ C.$)/G_{eq}(t=20°$ C.$) \geq 0.5$. In the above-described elastic material, a dimension of deformation (strain ratio) at the time of marginal deformation preferably satisfies strain ratio$\geq 400\%$ within a range of 0° C. to 40° C. Preferably, under aging conditions equivalent to aging of 60 years, aging deterioration of the elastic material evaluated by change of rate of $H_{eq}$ and $G_{eq}$ is within a range of $H_{eq}(60 \text{ years})/H_{eq}(0 \text{ year}) > 0.8$, and $G_{eq}(60 \text{ years})/G_{eq}(0 \text{ year}) < 1.2$.

Effect of the Invention

The following effects can be achieved according to the first aspect of the present invention.

1. Since the vibration damper is constituted of the first plate, the second plate, and the elastic material filled therebetween, it is possible to reduce the weight and size of a vibration damper. In addition, when the vibration damper is attached to framework members, a hollow space portion is formed by constituting the vibration damper such that the first clearance and the second clearance are formed. Therefore, members and/or parts can be arranged in the space portion, thereby securely attached to the joint portion between the framework members.

2. Since the first plate and the second plate are made of steel plate, it is possible to ensure strength of the plates, thereby securely ensuring anti-seismic performance (earthquake proof) as a vibration damper.

3. Since the vibration damper can be installed (bridged) to the framework members with an oblique arrangement at minimum area by the first plate and the second plate, it is possible to reduce the consumption of materials, and produce a vibration damper that contributes to enhancement of anti-seismic performance at low cost. Further, since the vibration damper is installed in an oblique arrangement to the framework members by the first plate and the second plate, anti-seismic strength (earthquake resistance) can be adjusted easily by increasing or decreasing the area of joint face of the first plate and the second plate.

4. Even though joists are arranged, arrangement of the vibration damper does not interfere with the presence of the joists when the vibration damper is attached to the joint portion between the column and the ground-sill. Therefore, it is possible to securely attach the vibration damper to the joint portion between the framework members.

According to the second aspect of the present invention, it is possible to achieve the effects of the above-described 1 and 4.

Further, by forming the first plate and the second plate of steel plate, it is possible to achieve an effect of the above-described 2. Further, since the first plate and the second plate are made of the same member, it is possible to enhance the production efficiency of the vibration dampers, and to produce the vibration dampers at low cost.

Where the anchor bolt for connecting the ground-sill and the foundation can be arranged in the space portion, it is possible to attach the vibration damper to the joint while avoiding interference between the anchor bolt and the vibration damper. Therefore, the vibration damper can be securely attached to the joint portion between the framework members.

Further, by controlling the elastic material to have the above-described physical properties, the vibration damper can securely exert a desired performance.

EXPLANATION OF SYMBOLS 10, 110 . . . vibration damper, 11, 111 . . . first plate, 13, 113 . . . second plate, 15, 115 . . . elastic material, 21, 121 . . . fixing portion (first fixing portion), 29, 129 . . . fixing portion (second fixing portion), 50 . . . space portion, 51 . . . ground-sill (framework member), 53 . . . column (framework member), 55 . . . joint portion, 57 . . . joist, 63 . . . anchor bolt, W1 . . . first clearance, W2 . . . second clearance.

BEST MODE FOR CARRYING OUT THE INVENTION

Next, an embodiment of the present invention is explained with reference to FIGS. 1 to 10. In each figures used in the below-described explanation, dimensions of respective members are modified so as to visualize each member in a figure.

Figure 1:
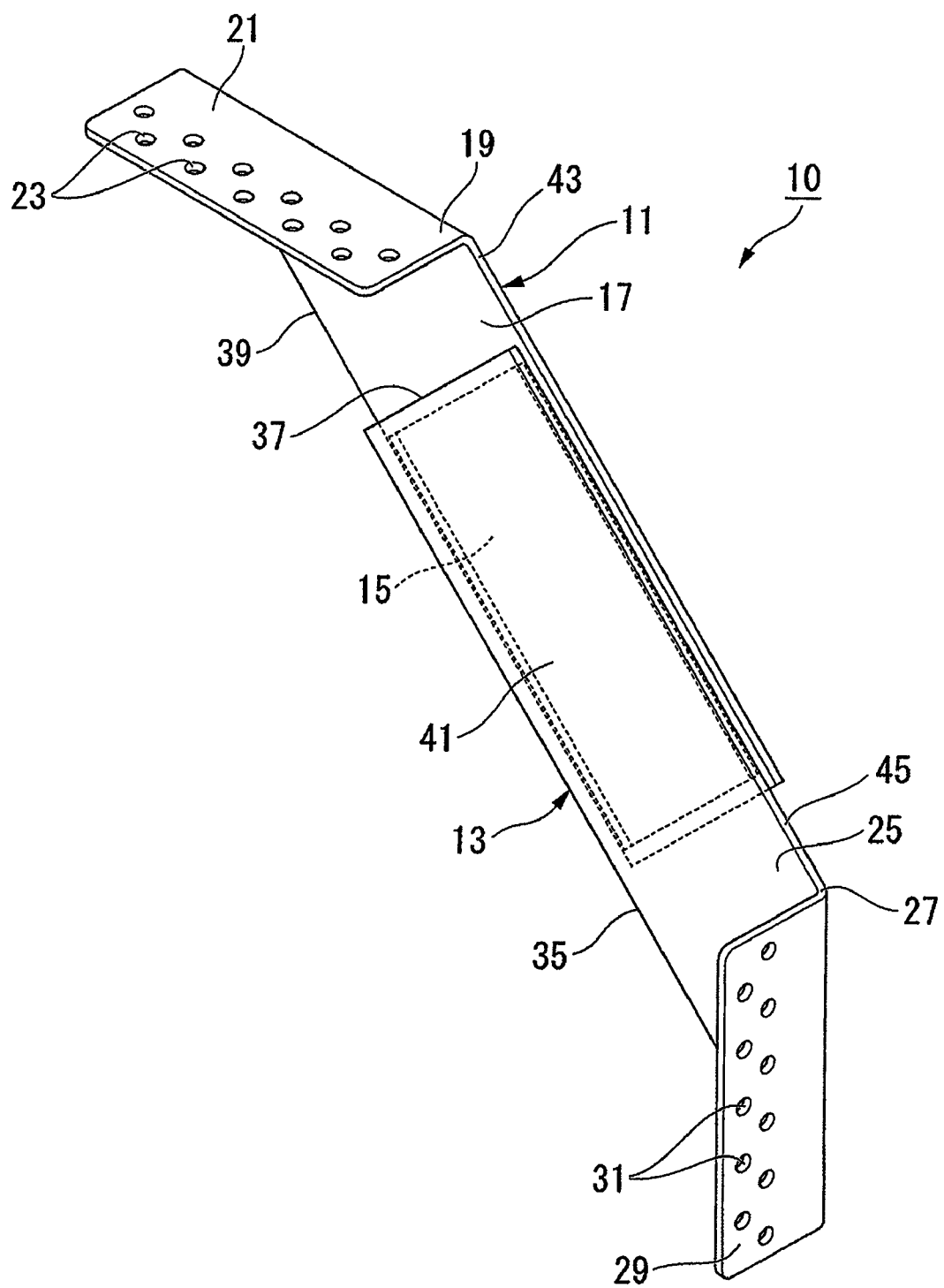
FIG. 1 is a perspective view of a vibration damper according to a first embodiment of the present invention.
Figure 2:
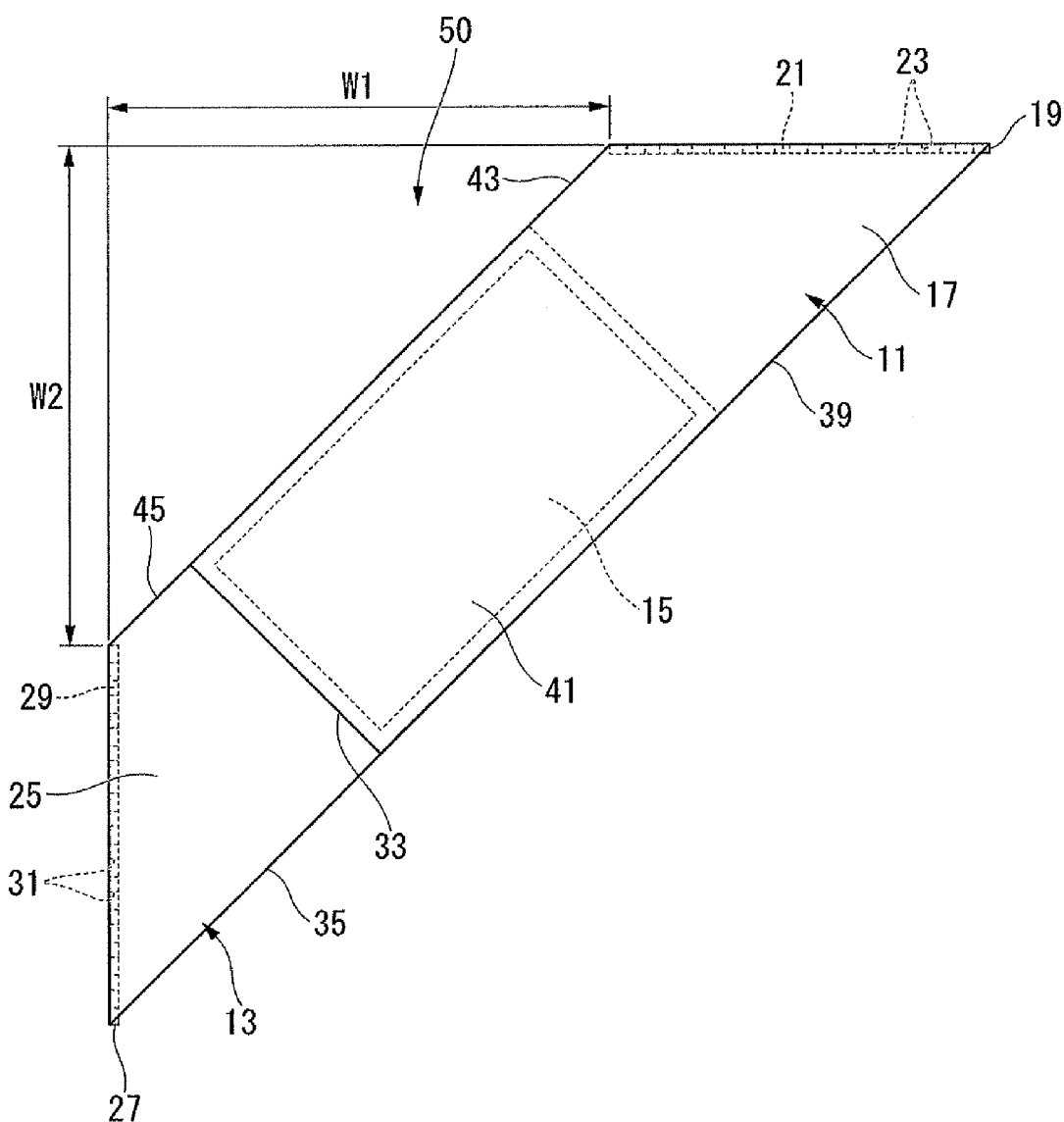
FIG. 2 is a front view of a vibration damper according to a first embodiment of the present invention.
Figure 3:
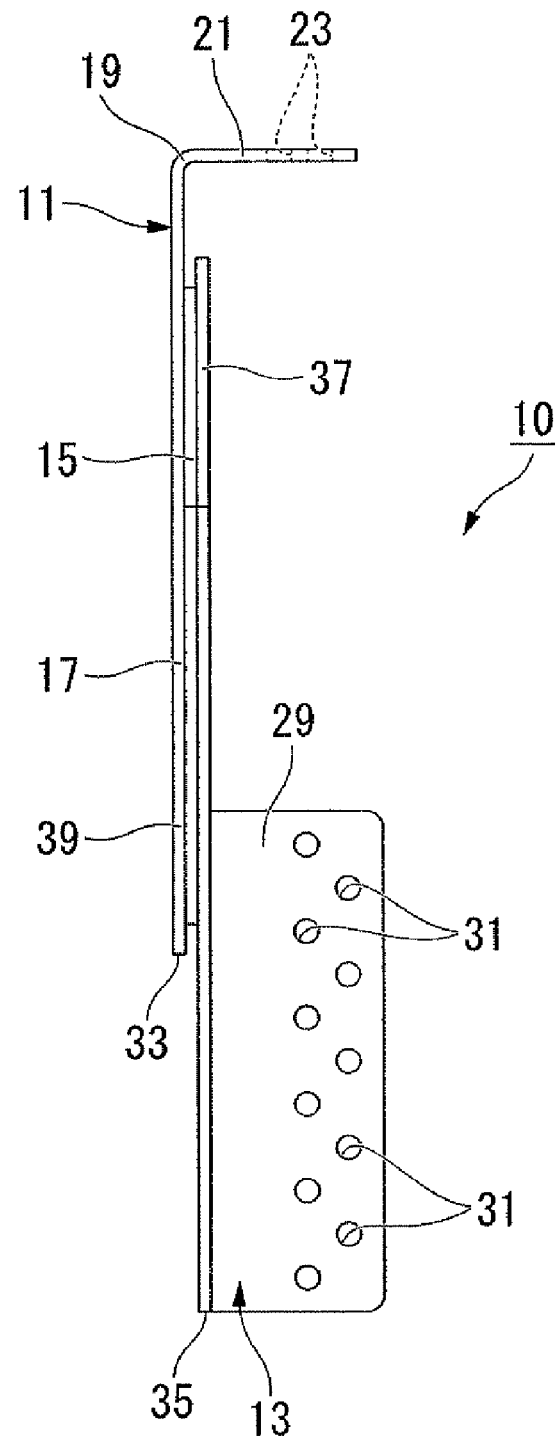
FIG. 3 is a side view of a vibration damper according to a first embodiment of the present invention.

FIGS. 1 to 4 show a first embodiment of the present invention. As shown in FIGS. 1 to 3, the vibration damper 10 comprises a first plate 11 having a substantially trapezoidal shape in a front view; a second plate 13 formed to have a shape axi-symmetric to that of the first plate 11; and an elastic material 15 that is filled in the interstices between the first plate 11 and the second plate 13 and joins (binds) the first plate 11 and the second plate 13.

The first plate 11 is a plate-shaped member made of a steel plate, for example, SS400 or the like. Flat portion 17 of the first plate 11 is formed to have substantially a trapezoidal shape.

Further, a fixing portion 21 is formed by folding (bending) the first plate 11 at substantially right angle at end portion 19 of the flat portion 17. A plurality of through holes 23 are formed in the fixing portion 21 such that the first plate can be fixed to a framework member by inserting screws, nails or the like in the through holes 23. An end edge 33 on the opposite side of the fixing portion 21 is formed perpendicular to the short edge (short side edge) 23 and long edge (long side edge) 39 formed on both sides of the end edge 33.

The second plate 13 has substantially the same constitution as the first plate 11, and is a plate shaped member made of a steel plate, for example, SS400 or the like.

Flat portion 25 of the second plate 13 is formed to have substantially a trapezoidal shape. A fixing portion 29 is formed by folding the second plate at a substantially right angle at end portion 27 of the flat portion 25. A plurality of through holes 31 are formed in the fixing portion 29 such that the second plate 13 can be fixed to a framework member by inserting screws, nails or the like in the through holes 31. An end edge 37 on the opposite side of the fixing portion 29 is formed perpendicular to the short edge 45 and a long edge 35 formed on both sides of the end edge 37.

The end edge 33 of the first plate 11 and the end edge 37 of the second plate 13 have substantially the same length. The first plate 11 and the second plate 13 are arranged such that the short edge 43 of the first plate 11 and the short edge 45 of the second plate 13 are flush-fitted, and the long edge 39 of the first plate 11 and the long edge 35 of the second plate 13 are flush-fitted. That is, the joint-face 41 where the first plate 11 and the second plate 13 overlap each other is formed to have a substantially rectangular shape (rectangle).

A first clearance W1 is formed between an end of the fixing portion 21 of the first plate 11 on the side of the short edge 43 and a plane on which the fixing portion 29 of the second plate 13 is formed. A second clearance W2 is formed between an end of the fixing portion 29 of the second plate 13 on the side of the short edge 45 and a plane on which the fixing portion 21 of the first plate 11 is formed. A region bordered by the first clearance W1 and the second clearance W2 constitutes a space portion 50 (space, void). The space portion 50 is constituted to have a right-angled triangle shape in a front view.

An elastic material 15 is filled in the interstices between the first plate 11 and the second plate 13. For example, a material formed of macromolecular raw material such as acryl-based, silicone-based, asphalt-based, and rubber-based polymer, or a composite material thereof. The first plate 11 and the second plate 13 is joined to each other by the elastic material 15. The elastic material is filled on substantially all area of the joint face 41.

Hear, the elastic material 15 is explained in detail.

In general, rigidity of a viscoelastic material (elastic material) increases with increasing amplitude, thereby enhancing drag force, When a viscoelastic material having properties in which rigidity increases with increasing amplitude is used, acceleration response of a building occurs and stress of respective member increases excessively. Therefore, a viscoelastic material used in a vibration damper 10 is preferably constituted of a viscoelastic material having properties such that increase of rigidity saturates even when the amplitude increases. Further, a viscoelastic material used in a vibration damper 10 preferably has little (small) strain dependence since the vibration damper is required to function in a wide range of vibration including ambient vibration such as traffic vibration, vibrations caused by a strong wind, and vibrations caused by large earthquakes.

As shown in Table 1, the viscoelastic material used in the present invention has stable energy absorbing ability of Heq (equivalent viscous damping coefficient: equivalent damping factor)>0.24 within a range of 0.125≦γ(shear strain)≦3.0. Even when the amplitude increases, the ratio of Geq (equivalent shear modulus) at γ=3 and at =1 decreases to be $0.40 \leq \{Geq_{(\gamma=3.0)}\}/\{Geq_{(\gamma=1.0)}\} < 0.60$. Where the above-described ratio exceeds 0.60, the acceleration response of a building increases and excessive stress is loaded on members of respective parts of the building, thereby making it difficult to optimally design the vibration damper 10. Where the ratio is lower than 0.4, contribution of the vibration damper 10 such that a rigidity of whole building is partially shared by the vibration damper decreases, thereby making it difficult to reduce the cost of members of the building. Here an equivalent shear modulus Geq is obtained as Geq=Keq/(S/D).

Figure 5:
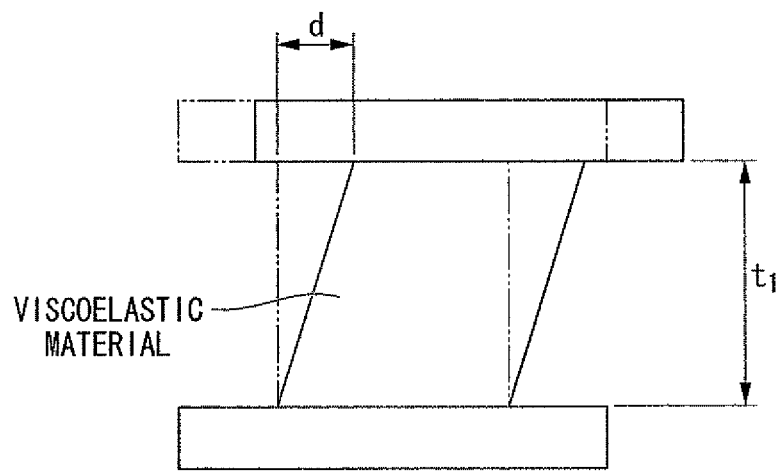
FIG. 5 is a schematic drawing for determining shear strain of an elastic material (viscoelastic material) according to a first embodiment of the present invention.
Figure 6:
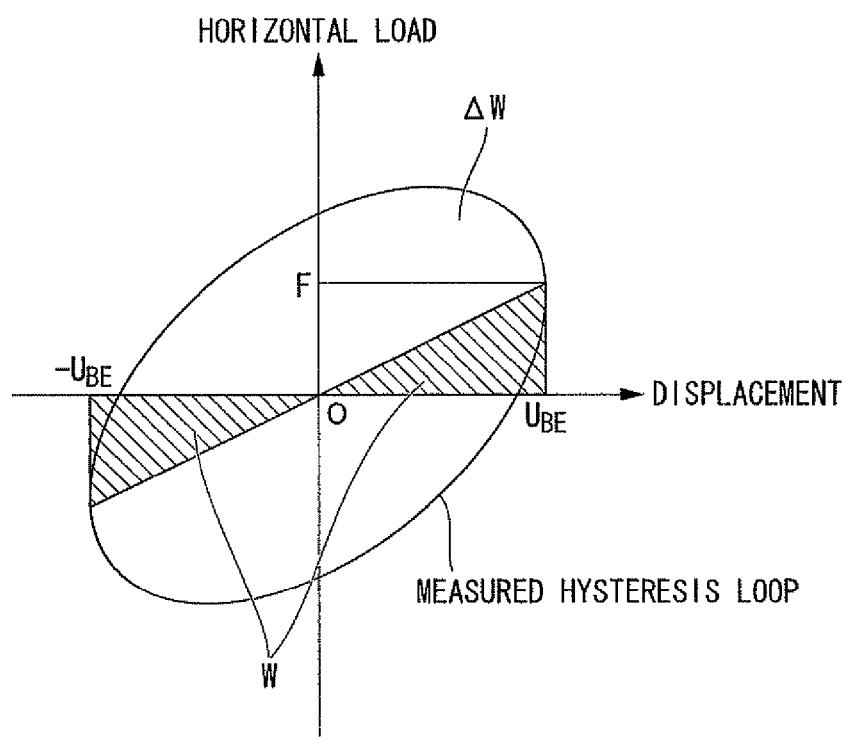
FIG. 6 is a hysteresis loop of an elastic material (viscoelastic material) according to a first embodiment of the present invention.

Hear, γ denotes shear strain which is, as shown in FIG. 5, obtained by dividing shear deformation d of an viscoelastic material by a thickness $t_1$ of the viscoelastic material ($\gamma = d/t_1$). Heq and Geq are obtained by causing shear deformation of the elastic material by excitation of a sine wave, determining the hysteresis loop as shown in FIG. 6, and calculating based on the below described formulae.

$$Heq = \Delta W / 2\pi W,$$

where W denotes elastic energy (N·mm) of shear deformation (area of slashed portion in FIG. 6), and
ΔW denotes the sum of energy (N·mm) absorbed by shear deformation (area of elliptic portion shown in FIG. 6).

$$Geq = Keq/(S/D) = F/U_{BE}/(S/D),$$

where F denotes a load (N) at the time of causing maximum displacement,
$U_{BE}$ denotes the maximum displacement (mm), and
S/D denotes the shape factor (shearing area of the sample/shearing clearance of the sample) of test sample.

TABLE 1

| | <Strain Dependence> | | | | | |
|---|---|---|---|---|---|---|
| γ | 0.125 | 0.25 | 0.50 | 1.0 | 2.0 | 3.0 |
| Geq (N/m²) | 1.765 | 1.096 | 0.660 | 0.405 | 0.2555 | 0.210 |
| Rate of change of Geq | (4.37) | (2.71) | (1.63) | (1.00) | (0.63) | (0.52) |
| Heq | 0.2888 | 0.281 | 0.298 | 0.333 | 0.354 | 0.319 |
| Rate of change of Heq | (0.87) | (0.85) | (0.90) | (1.00) | (1.07) | (0.96) |

Remarks:
Sample: a pair of disk shaped test samples each having a diameter of 25 mm, and a thickness of 5 mm, Frequency: 2.0 Hz, Temperature: 20° C., Rate of change was normalized by a value where γ=1.

As shown in Table 2, $G_{eq}$ (N/mm²) of a general viscoelastic material remarkably increases with increasing frequency. For example, at a temperature of 20° C., the Geq value at a frequency of 2.0 Hz is 2 to 3 times the Geq value at a frequency of 0.1 Hz. The dominant frequency of traffic vibration distributes within a range of 4 to 7 Hz, and seismic vibration is distributed within the range of about 0.1 Hz to about 20 Hz. Therefore, a viscoelastic material used in a vibration damper preferably has a relatively stable rigidity and damping performance against a seismic vibration in which distribution range of the input frequencies shows relatively wide range.

The damping performance of a general viscoelastic material can be expressed substantially as a product of the rigidity (hear shown by Geq) of the material and the damping coefficient (hear shown by Heq).

In the viscoelastic material used in the present invention, the value of the product based on a certain frequency under a predetermined temperature is within ±50% within a range of 0.1 to 20 Hz. When the range exceeds ±50%, it is difficult to exert stable rigidity and damping performance against a seismic vibration in which the input frequency is distributed in a wide range (distribution within ca. 1 to 20 Hz).

TABLE 2

| Hz | \<Frequency dependence (rate of change)\> | | | | | | | | | | | | | |
|---|---|---|---|---|---|---|---|---|---|---|---|---|---|---|
|  | 0.1 | 0.5 | 1 | 2 | 3 | 4 | 6 | 8 | 10 | 12 | 14 | 16 | 18 | 20 |
| Rate of change of damping performance: product of (Geq) and (Heq) | (0.75) | (0.79) | (0.86) | (0.87) | (0.87) | (0.88) | (0.96) | (1.00) | (1.03) | (1.08) | (1.11) | (1.11) | (1.19) | (1.21) |

Remarks:

Sample: a pair of disk shaped test samples each having a diameter of 25 mm, and a thickness of 5 mm. Strain ratio: ±30%. Temperature: 20° C. The rate of change was normalized by a value at 10 Hz.

As shown in Table 3, the rigidity of a general viscoelastic material increases at low temperatures, and decreases at high temperatures. Under a climate, like in Japan, in which ambient temperature changes by a large amount throughout a year, a viscoelastic material used in a vibration damper 10 preferably has a relatively stable rigidity and damping performance at a temperature in a range of about 0 to 40° C.

When the Geq of the viscoelastic material of the present invention is evaluated with reference to Geq at 20° C., under low temperature conditions, the ratio of Geq(t=0° C.) at 0° C. and Geq(t=20° C.) at 20° C. satisfies Geq(t=0° C.)/Geq(t=20° C.)≦2.0, and under high temperature conditions, the ratio of Geq(t=40° C.) at 40° C. and Geq(t=20° C.) at 20° C. satisfies Geq(t=40° C.)/Geq(t=20° C.)≧0.5.

In a process of designing a building, it is necessary to provide a rigidity which withstands a high Geq(t=0° C.) of the viscoelastic material at low temperatures. Where Geq(t=0° C.)/Geq(t=20° C.) exceeds the above-described 2.0, the building has an overdesigned rigidity, resulting in a large increase in cost. Where Geq(t=40° C.)/Geq(t=20° C.) is smaller than the above-described 0.5, the damping performance (product of rigidity and damping coefficient) at 40° Cis decreases, thereby making it impossible to achieve stable damping performance. As described above, when the damping performance of a viscoelastic material differs largely in accordance with temperature, the position of attaching the damper to a building is limited to specific places with small temperature variations, such as an inner wall, and the degree of freedom in design is decreased.

TABLE 3

| \<Temperature Dependence\> | | | |
|---|---|---|---|
| Temperature (° C.) | 0 | 20 | 40 |
| Geq(N/mm$^2$) | 0.690 | 0.405 | 0.265 |
| Rate of change of Geq | (1.70) | (1.00) | (0.65) |

Remarks:

Sample: a pair of disk shaped test samples each having a diameter of 25 mm, and a thickness of 5 mm. Frequency: 2.0 Hz, strain ratio: ±100%, The rate of change was determined by normalization by Geq at 20° C.

Further, as shown in Table 4, in a general viscoelastic material, in order to exert a stable performance while tracking deformation of a building, it is necessary to avoid a decrease in the lateral force under conditions of 0° C. to 40° C., and within a range of shear strain γ≦3.0. The viscoelastic material used in the present invention exerts a strain ration ≧400% as a degree of deformation (strain ratio) at a time of marginal deformation at a temperature range of 0° C. to 40° C. Where the strain ratio of viscoelastic material is smaller than 400%, the material cannot track deformation of a building at a time of a large earthquake, and fracture of a viscoelastic material occurs.

TABLE 4

| \<Marginal Deformation\> | | | |
|---|---|---|---|
| Temperature | 0 | 20 | 40 |
| Marginal deformation (Strain ratio %) | 450% | 550% | 670% |

Remarks:

Sample: a pair of disk shaped test samples each having a diameter of 25 mm, and a thickness of 5 mm. Test speed: 300 mm/min, Temperature: 0° C., 20° C., 40° C.

As shown in Table 5, in general, age deterioration of a viscoelastic material is evaluated by subjecting the material to heat-accelerated deterioration corresponding to aging at 20° C. under aging conditions obtained by Arrhenius rule, subsequently causing lateral displacement of ±100% compared to a thickness of the viscoelastic material under conditions of a frequency of 0.1 Hz and a temperature of 20° C., and obtaining Heq and Geq. An equation expressing a relationship between temperature and time is obtained as follows by an expansion of the Arrhenius rule.

$$\ln(L_{20}/L_S) = (1/t_{20} - 1/t_s) \cdot (Ea/R),$$

where $L_{20}$ denotes the aging time (hr) at 20° C.

$L_S$ denotes the aging time (hr) at an arbitrary temperature, $t_{20}$ denotes a temperature of 20° C., $t_S$ denotes the arbitrary temperature (° C.), Ea denotes the activation energy (a value specific to a viscoelastic material), and R denotes a gas constant.

Based on the above-described equation, accelerated deterioration conditions were determined to be 80° C. for 7 days.

Aging deterioration of viscoelastic material used in the present invention corresponds to an endurance period required for a general building. Under the accelerated deterioration test corresponding to aging deterioration of 60 years, the rate of change of Heq and Geq fall within the ranges of Heq(60 years)/Heq(0 year)>0.8, and Geq(60 years)/Geq(0 year)<1.2. That is, a sufficient vibration controlling performance is maintained after a deterioration corresponding to 60 years. However, where the rates of change of Heq and Geq are outside the above-described ranges, it is necessary to replace a damper before the aging corresponding to 60 years because of deterioration of the performance of the vibration damper 10.

TABLE 5

<Aging deterioration>

| | Corresponding years | | | | |
|---|---|---|---|---|---|
| | 0 (initial stage) | 10 | 20 | 40 | 60 |
| Geq (N/mm$^2$) | 0.444 | 0.480 | 0.488 | 0.511 | 0.511 |
| Rate of change of Geq | (1.00) | (1.08) | (1.10) | (1.15) | (1.15) |
| Heq | 0.270 | 0.248 | 0.248 | 0.246 | 0.246 |
| Rate of change of Heq | (1.00) | (0.920) | (0.920) | (0.910) | (0.910) |

Remarks:

Test sample: a pair of square shaped test samples each having a side length of 100 mm, and a thickness of 20 mm.

Frequency: 0.1 Hz, Temperature: 20° C., Strain ratio: +100%.

As described above, the viscoelastic material used in the vibration damper 10 of the present invention has all of satisfactory strain dependence, frequency dependence, temperature dependence, marginal performance, and aging deterioration, thereby realizing excellent damping performance.

A viscoelastic material used in the vibration dampers is specifically formed of a rubber composition including a base rubber (base material rubber) composed of a polymer in which backbone (main chain) has C—C bond, and added and cross-linked with silica and a silane compound, wherein 100 to 150 parts by mass of silica is added to 100 parts by mass of base rubber, and silane compound is added in a mass equal to 10 to 30% of a mass of the silica.

For example, the rubber composition (viscoelastic material) may be obtained by mixing the above-described components using an internal mixer. Where the rubber composition is used in a vibration damper 10, the viscoelastic material may be produced by shaping the obtained rubber composition to a sheet shape using a roller head extruder or the like, punching the shaped sheet into a predetermined shape, stacking a plurality of the punched out sheets to have a predetermined thickness, heating the stacked sheets in a predetermined mold, thereby for example, subjecting the composition to a cure molding.

Measurements of values of the above-described various properties were performed using test samples of damping rubber (vibration damping rubber). The test samples of damping rubber may be formed by bonding the rubber to a pair of steel plates utilizing self-tack property or using a general adhesive. In this embodiment, the bonding was performed by cure bonding because of its reliability in bonding. For example, a damping rubber (viscoelastic material) before curing was extruded to have a predetermined shape, cut, and heated in a predetermined mold at a preliminary shaped state, thereby being subjected to cure-molding. By performing the cure bonding at the same time as the pressure-curing, test samples of damping rubber were produced.

Then, the thus produced damping rubber samples were installed in a servopulser endurance tester EHF-EV020K2-040-1A manufacture by Shimazu Corporation such that two test samples were pinched intervening steel plates therebetween. Thus, measurements of the above-described Geq or the like were performed.

Next, a case of setting the vibration damper in a wooden construction is explained with reference to FIG. 4.

Figure 4:
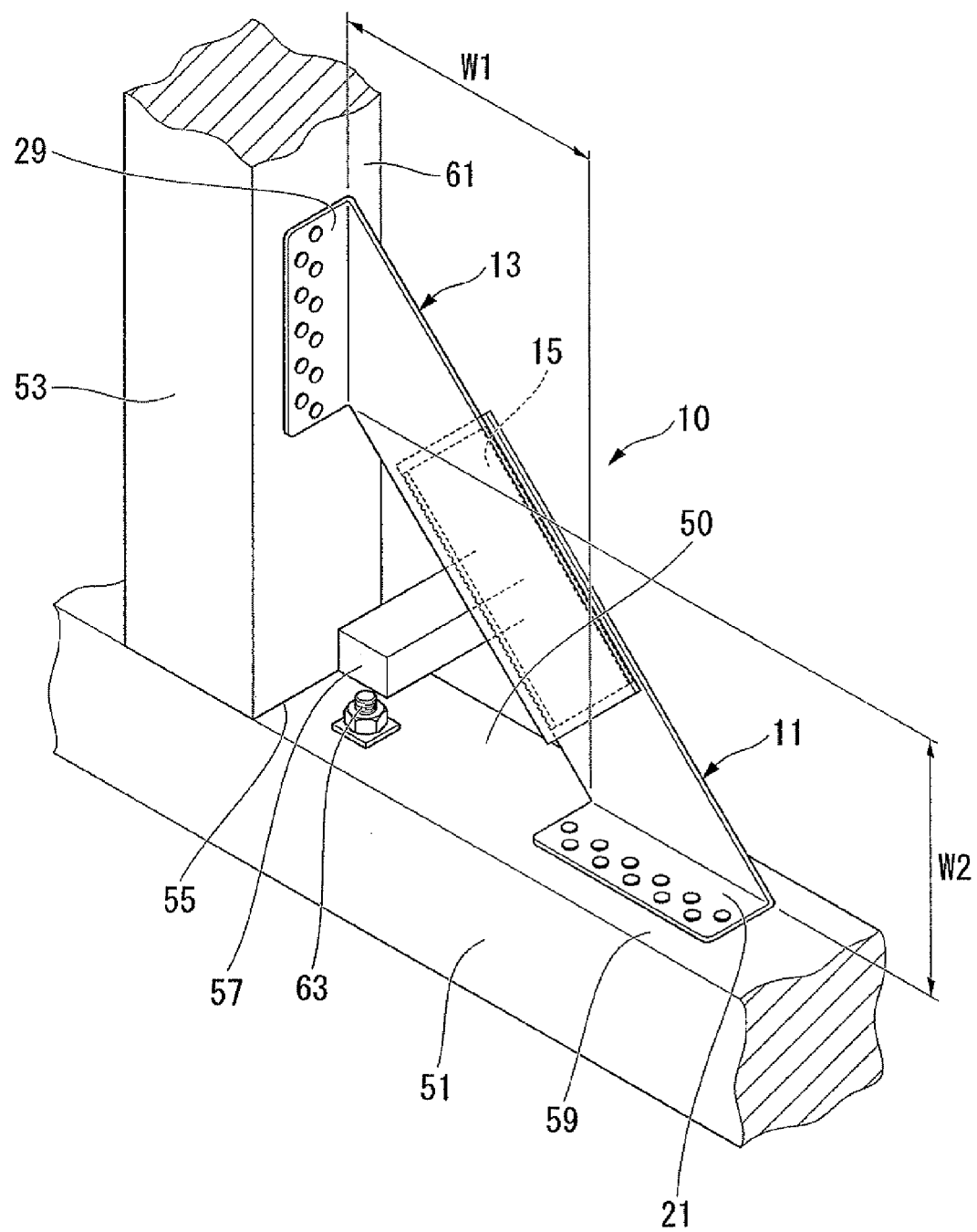
FIG. 4 is a perspective view showing an example where a vibration damper according to the first embodiment of the present invention is installed in a wooden construction.

As shown in FIG. 4, substantially whole outer circumference of a floor surface of a first floor is surrounded by a ground-sill 51 made of square timbers placed substantially horizontal on a foundation (not shown) made of concrete or the like.

Columns 53 constituted of square timbers are raised (set up) with interval substantially vertically above the ground-sill 51. The ground-sill 51 and the columns 53 are fitted to each other by fitting engagement portions (not shown) formed at their joint portion 55.

Sleepers (not shown) and joists are arranged to form a grid constituting a floor plane of the first floor. Joists 57 are arranged such that their end portions are placed on the ground-sill 51. As shown in FIG. 4, some (partial numbers) of the joists 57 are arranged in the vicinity of the joint portion 55 between the ground-sill 51 and the column 53.

A vibration damper 10 is disposed to the above-described construction. The vibration damper 10 is arranged such that a fixing portion 21 of the first plate 11 touches the upper surface 59 of the ground-sill 51, and the first plate 11 and the foundation are joined by hammering nails or the like through the through holes 23 of the fixing portion 21. In addition, the vibration damper 10 is arranged such that fixing portion 29 of the second plate 13 touches the surface 61 of the column 53, and the second plate 13 and the column 53 are joined by hammering nails or the like thorough the through holes 31 of the fixing portion 29. Thus, the vibration damper can be easily attached to a wooden construction. At that time, the vibration damper 10 is installed (bridged) between the ground-sill 51 and the column 53 in an oblique arrangement. When the vibration damper 10 is installed between the ground-sill 51 and the column 53, a region surrounded by the ground-sill 51, column 53, and the vibration damper 10 constitutes a space portion 50.

At that time, a joist 57 is positioned in the space portion 50 formed by the vibration damper 10, such that the vibration damper 10 is attached while avoiding interference with the joist 57.

Where necessary, the vibration dampers 10 are attached to joint portions between framework members, for example, joint portion between the column 53 and a beam (not shown).

In order to join the ground-sill 51 and the foundation, anchor bolts 63 are hammered from the upper surface 59 of the ground-sill 51 towards the foundation. Along the circumference of the first floor of the wooden construction the anchor bolts 63 are arranged with proper intervals, and are hammered from the ground-sill 51 towards the foundation. When the anchor bolts 63 are hammered, head portions of the anchor bolts 63 protrude from the upper surface 59 of the ground-sill 51. In the present invention, even when anchor bolts 63 are hammered in the space portion 50 of the vibration damper 10, the vibration damper 10 is constituted such that the head portion of the anchor bolts 63 can be arranged within the space portion 50.

In the above-described constitution, a joint portion 55 of the foundation 51 and the column 53 constituting the wooden construction does not have a perfectly rigid structure. Therefore, a vicinity of the joint portion 55 is deformed, for example, in the time of earthquake.

When the vicinity of the joint portion 55 is deformed, the first plate 11 and the second plate 13 of the vibration damper 10 accept the seismic force, and the flat portion 17 of the first plate 11 and the flat portion 25 of the second plate 25 rotate to directions opposite to each other. This movement is accompanied by shear deformation of the elastic material 15. As a result, seismic energy is absorbed. Thus, anti-seismic strength of the wooden construction can be improved.

In the present embodiment, the vibration damper disposed in the vicinity of framework members of a wooden construction comprises a first plate 11 that is fixed to the ground-sill 51 and projects from the ground-sill 51, a second plate 13 that is fixed to a column 53 and projects from the column 53, and an elastic material 15 that is filled in the interstices between the first plate 11 and the second plate 13 and joins the first plate 11 and the second plate 13. A first clearance W1 is formed between the column 53 and an end of the fixing portion 21 of the first plate 11 on the side of the short edge 43, and a second clearance W2 is formed between the ground-sill 51 and an end of the fixing portion 29 of the second plate 13 on the side of the short edge 45.

By this constitution, the vibration damper 10 is constituted of a first plate 11, a second plate 13, and an elastic material filled therebetween, thereby weight reduction and downsizing of the vibration damper 10 are realized. In addition, by forming the first clearance W1 and the second clearance W2, hollow space portion 50 is formed when the vibration damper 10 is attached to framework members such as a ground-sill 51 and a column 53. As A result, members such as joists 57 and parts are arranged in the space portion 50. Therefore, the vibration damper 10 can be securely attached to a joint portion between framework members, for example, a joint portion 55 of the ground-sill 51 and the column 53.

The first plate 11 was constituted of a plate made of a steel plate directing from the fixing portion 21 to the fixing portion 29, and the second plate 13 was constituted of a plate made of a steel plate directing from the fixing portion 29 to the fixing portion 21.

Therefore, it is possible to ensure the strength of the first plate 11 and the second plate 13, thereby securely ensuring anti-seismic performance of the vibration damper 10. By the first plate 11 and the second plate 13, it is possible to install the vibration damper in an oblique arrangement to the framework members with least minimum area, it is possible to reduce the material, thereby producing a vibration damper 10 contributing improvement of anti-seismic performance at low cost. Further, since the vibration damper 10 is installed (bridged) in oblique arrangement to the framework members by the first plate 11 and the second plate 12, it is easy to control anti-seismic performance by increasing or decreasing of the area of joint face 41.

The space portion 50 constituted (bordered) by the first clearance W1, second clearance W2, the first plate 11, and the second plate 13 has a dimension which is at least sufficient for inserting a joist 57 therein.

Therefore, the vibration damper can be attached to a joint portion 55 between the ground-sill 51 and the column 53 while avoiding interference with the joist 57 even when the joist 57 is arranged near the joint portion 55. Therefore, the vibration damper can be attached to the joint portion of the framework members, for example, joint portion 55 between the ground-sill 51 and the column 53.

Further, anchor bolts 63 for joining the ground-sill 51 and the foundation in the vicinity of the joint portion 55 can be arranged in the space portion 50.

Therefore, the vibration damper 10 can be attached to a joint portion 55 between the ground-sill 51 and the column 53 while avoiding interference with an anchor bolts 63 even when the anchor bolt 63 is arranged near the joint portion 55. Therefore, the vibration damper can be attached to the joint portion of the framework members, for example, the joint portion 55 between the ground-sill 51 and the column 53.

FIGS. 7 to 10 shows a second embodiment of the present invention.

Figure 7:
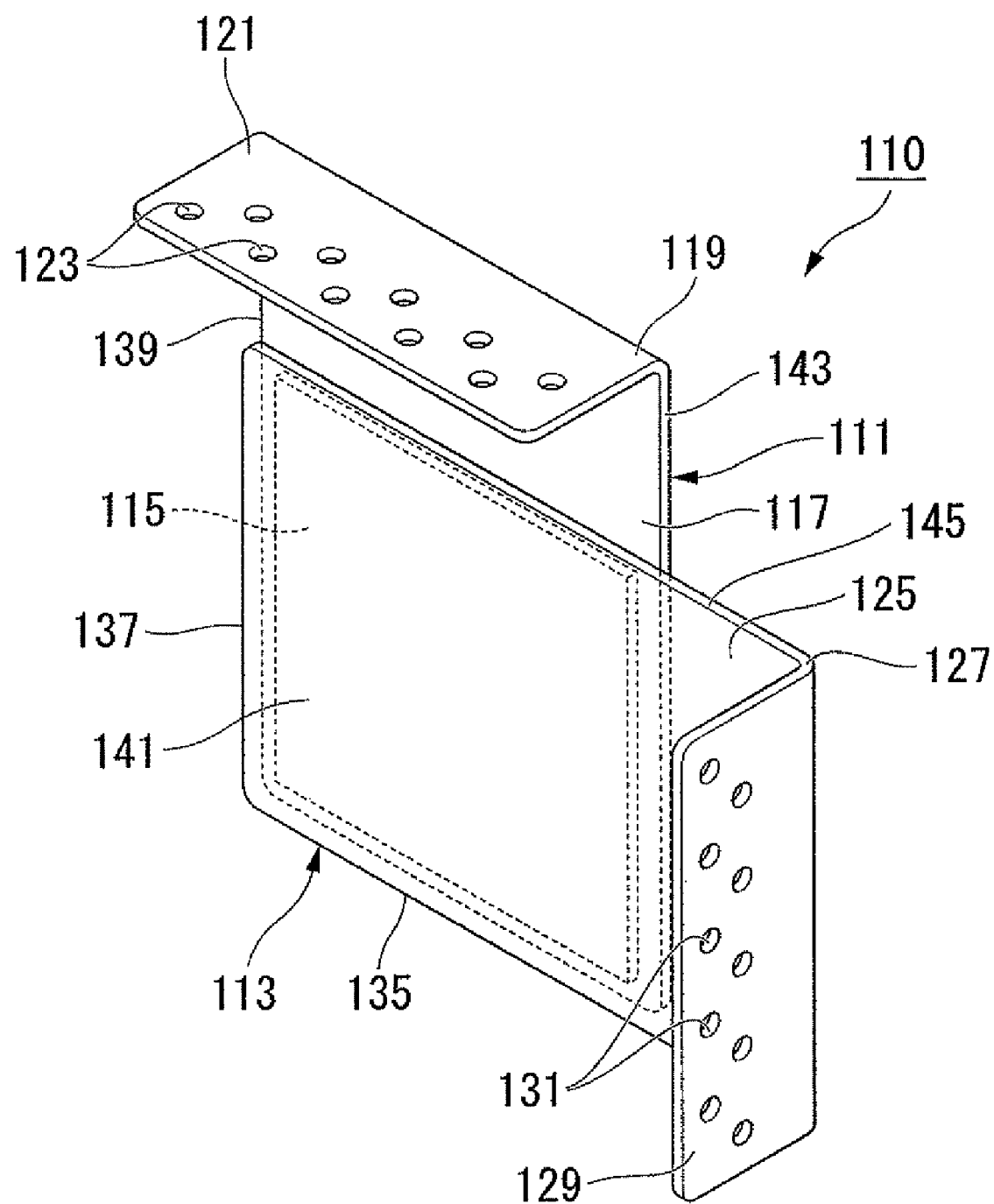
FIG. 7 is a perspective view of a vibration damper according to a second embodiment of the present invention.
Figure 8:
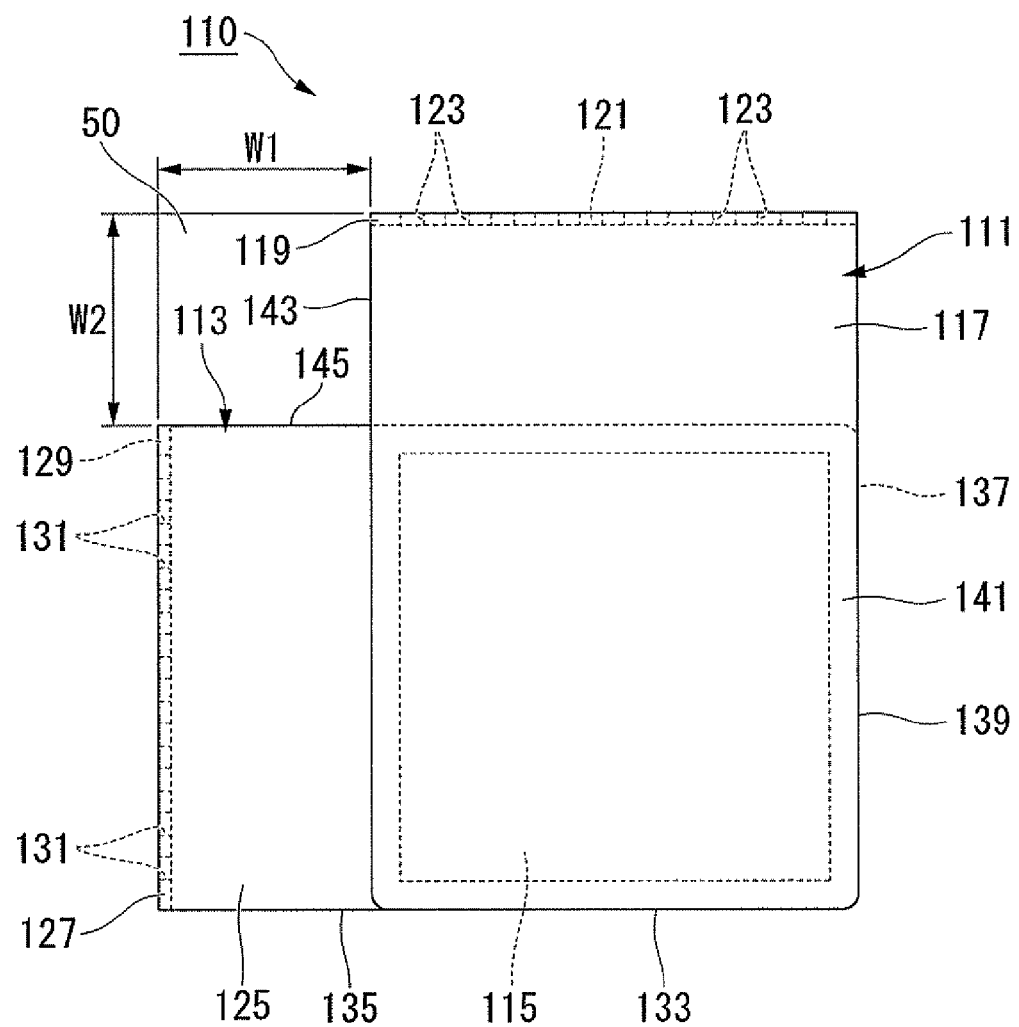
FIG. 8 is a front view of a vibration damper according to a second embodiment of the present invention.
Figure 9:
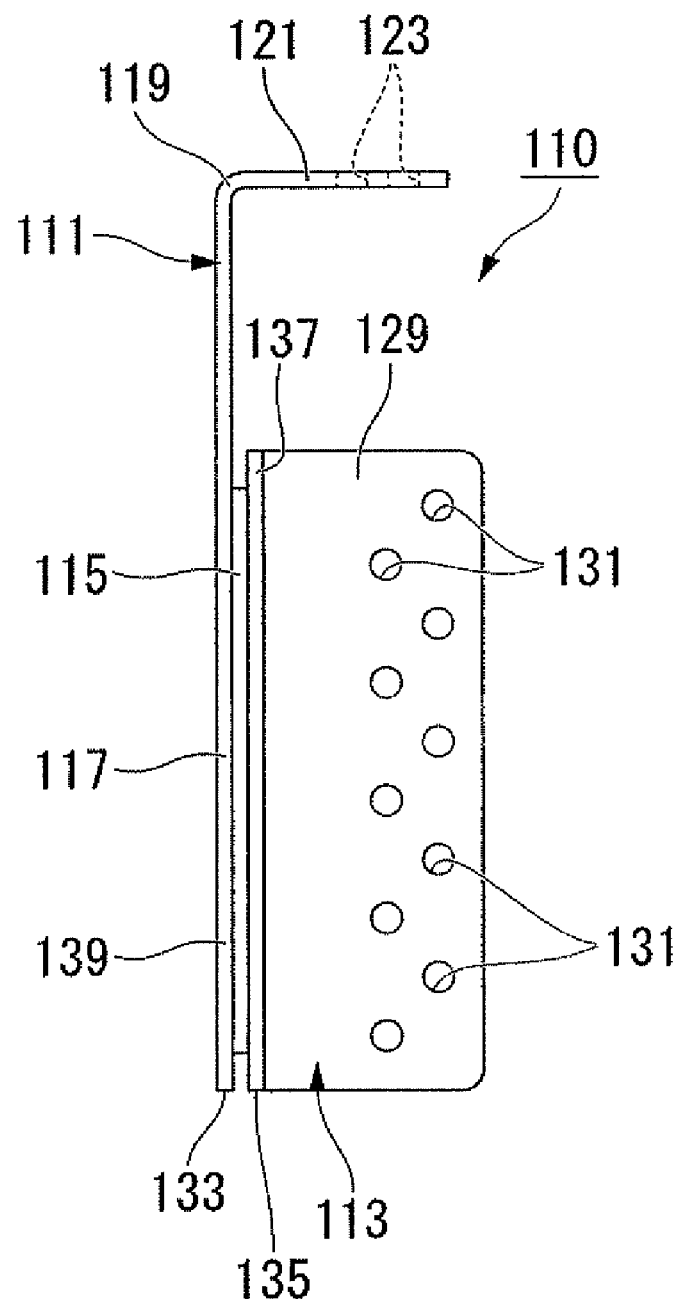
FIG. 9 is a side view of a vibration damper according to a second embodiment of the present invention.

As shown in FIGS. 7 to 9, the vibration damper 110 comprises a first plate 111 having a substantially rectangular shape in a front view, a second plate 113 formed to have the same shape as the first plate 111 and is arranged at a state about 90° rotated from the first plate 111, and an elastic material 115 that is filled in the interstices between the first plate 111 and the second plate 113 and join the first plate 111 and the second plate 113.

The first plate 111 is a plate-shaped member made of a steel plate, for example, SS400 or the like. A flat portion 117 of the first plate 111 is formed to have substantially a rectangular shape.

Further, a fixing portion 121 is formed by folding the first plate 111 at a substantially right angle at an end portion 119 of the flat portion 117. A plurality of through holes 123 are formed in the fixing portion 121 such that the first plate 111 can be fixed to a framework member by inserting screws, nails or the like in the through holes 123.

The second plate 113 has substantially the same constitution as the first plate 111, and is a plate shaped member made of a steel plate, for example, SS400 or the like. A flat portion 125 of the second plate 13 is formed to have substantially a rectangular shape. A fixing portion 129 is formed by folding the second plate 113 at a substantially right angle at an end portion 127 of the flat portion 125. A plurality of through holes 131 are formed in the fixing portion 129 such that the second plate 113 can be fixed to a framework member by inserting screws, nails or the like in the through holes 131.

The first plate 111 and the second plate 113 are arranged in a state in which one plate is rotated from another plate with a rotation angle of about 90°. The first plate 111 and the second plate 113 are arranged such that the end edge 133 of the first plate 111 on the end opposite to the fixing portion 119 and a side edge 135 of the second plate 113 most apart from the fixing portion 121 are flush-fitted. That is, the joint-face 141 where the first plate 111 and the second plate 113 overlap each other is formed to have substantially square shape.

A first clearance W1 is formed between a side edge 143 on opposite side of the side edge 139 of the first plate 111 and an end portion 127 of the second plate 113, and a second clearance W2 is formed between a side edge 145 on opposite side of the side edge 135 of the second plate 113 and an end portion 119 of the first plate 111. A region bordered by the first clearance W1 and the second clearance W2 constitutes a space portion 50. The space portion 50 has a dimension sufficient for arranging a joist 57 and an anchor bolt 63 therein.

An elastic material 115 is filled in the interstices between the first plate 111 and the second plate 113. For example, the elastic material 115 is constituted of a material formed of macromolecular raw material such as acryl-based, silicone-based, asphalt-based, and rubber-based polymer, or a composite material thereof. The first plate 111 and the second plate 113 are joined to each other by the elastic material 115. The elastic material is filled on substantially the entire area of the joint face 141. Preferable physical properties such as strain-dependence, frequency dependence, temperature dependence, marginal performance, aging deterioration or the like are the same as those of the elastic material 15 (see the above-described Tables 1 to 5) of the first embodiment. The composition of a rubber composition constituting the elastic material 115, production method of the rubber composition, and methods of measuring the above-described physical properties are the same as those of the first embodiment. Therefore, those matters are omitted from the explanation.

Next, a case of setting the vibration damper 110 in a wooden construction is explained with reference to FIG. 10. In the below description, members having the same constitutions as those explained in the first embodiment are given the same symbols as the first embodiment and explanation thereof are omitted.

Figure 10:
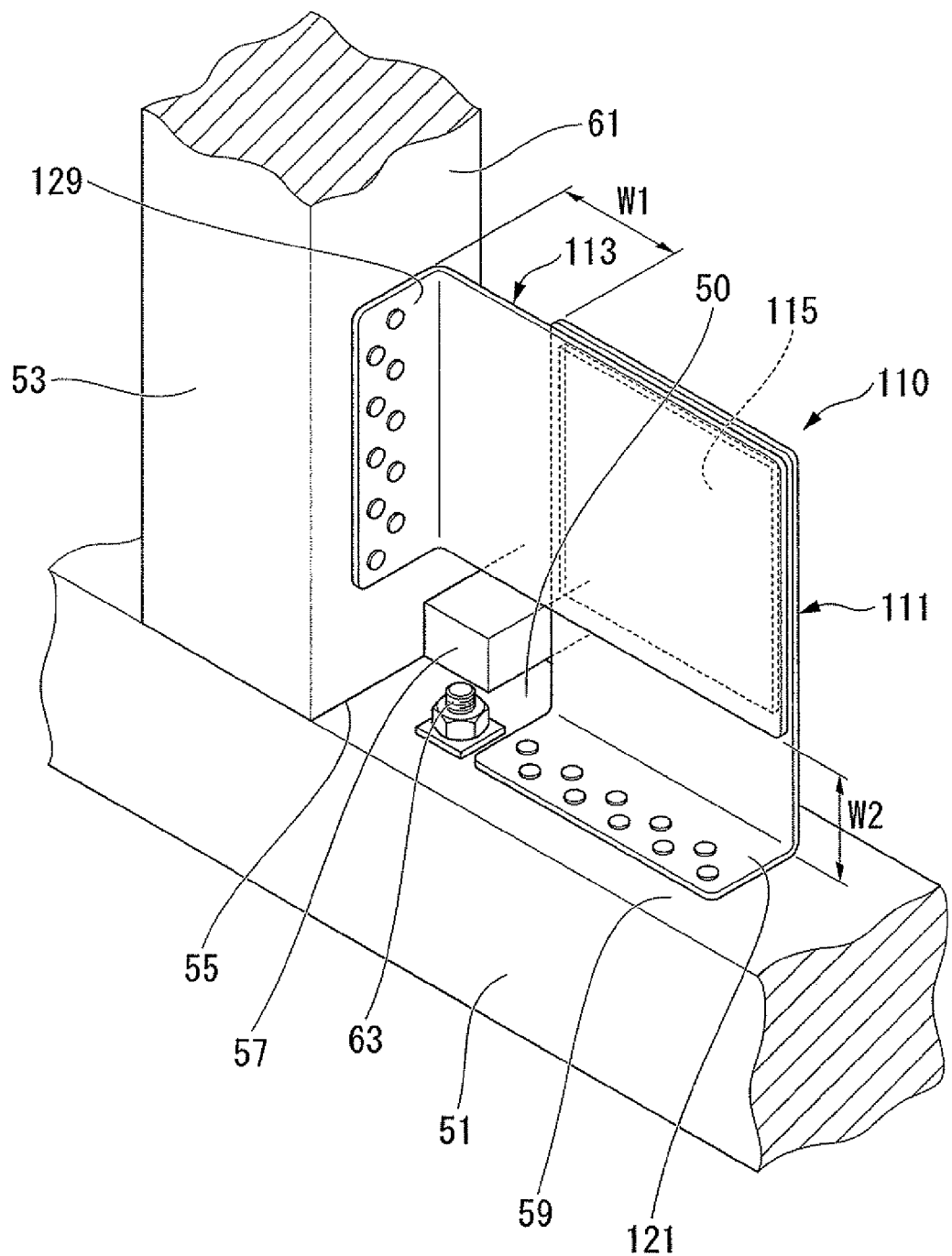
FIG. 10 is a perspective view showing an example where a vibration damper according to the second embodiment of the present invention is installed in a wooden construction.

As shown in FIG. 10, substantially the whole outer circumference of a floor surface of a first floor is surrounded by a ground-sill 51 placed on a foundation (not shown). Columns 53 are raised (set up) with proper interval substantially vertically above the ground-sill 51. The ground-sill 51 and the columns 53 are fitted to each other by fitting engagement portions (not shown) formed at their joint portions 55.

Joists 57 constituting a ground floor are arranged such that their end portions are placed on the ground-sill 51. Some (partial numbers) of the joists 57 are arranged in the vicinity of the joint portion 55 between the ground-sill 51 and the column 53.

A vibration damper 110 is disposed to the above-described construction. The vibration damper 110 is arranged such that a fixing portion 121 of the first plate 111 touches the upper surface 59 of the ground-sill 51, and the first plate 111 and the ground-sill 51 are joined by hammering nails or the like thorough the through holes 123 of the fixing portion 121. In addition, a fixing portion 129 of the second plate 113 touches the surface 61 of the column 53, and the second plate 113 and the column 53 are joined by hammering nails or the like thorough the through holes 131 of the fixing portion 129. Thus, the vibration damper 110 can be easily attached to a wooden construction.

When the vibration damper 110 is installed between the ground-sill 51 and the column 53, a region surrounded by the ground-sill 51, column 53, and the vibration damper 110 constitutes a space portion 50.

At that time, a joist 57 is positioned in the space portion 50 bordered by the vibration damper 110, such that the vibration damper 110 is attached while avoiding interference with the joist 57.

Where necessary, the vibration dampers 110 are attached to joint portions between framework members, for example, a joint between the column 53 and a beam (not shown).

In order to joining the ground-sill 51 and the foundation, anchor bolts 63 are hammered from the upper surface 59 of the ground-sill 51 towards the foundation. When the anchor bolts 63 are hammered, head portions of the anchor bolts 63 protrude from the upper surface 59 of the ground-sill 51. In the present invention, even when the anchor bolts 63 are hammered in the space portion 50 of the vibration damper 10, the vibration damper 10 is constituted such that the head portions of the anchor bolts 63 can be arranged within the space portion 50.

In the above-described constitution, joint portion 55 of the ground-sill 51 and the column 53 constituting the wooden construction does not have a perfectly rigid structure. Therefore, a vicinity of the joint portion 55 is deformed, for example in the time of, for example, an earthquake.

When the vicinity of the joint portion 55 is deformed, the first plate 111 and the second plate 113 of the vibration damper 110 accept the seismic force, and the flat portion 117 of the first plate 111 and the flat portion 125 of the second plate 113 rotate to directions opposite to each other. This movement is accompanied by shear deformation of the elastic material 15. As a result, seismic energy is absorbed. Thus, the anti-seismic strength of the wooden construction can be improved.

In the present embodiment, the vibration damper 110 disposed in the vicinity of framework members of a wooden construction comprises a first plate 110 that is fixed to the ground-sill 51 and projects from the ground-sill 51, a second plate 113 that is fixed to a column 53 and projects from the column 53, and an elastic material 115 that is filled in the interstices between the first plate 111 and the second plate 113 and joins the first plate 111 and the second plate 113. A first clearance W1 is formed between the column 53 and the first plate 111, and a second clearance W2 is formed between the ground-sill 51 and the second plate 113.

By this constitution, the vibration damper 110 is constituted of a first plate 111, a second plate 113, and an elastic material 115 filled therebetween, thereby weight reduction and downsizing of the vibration damper 110 are realized. In addition, by forming the first clearance W1 and the second clearance W2, hollow space portion 50 is formed when the vibration damper 110 is attached to framework members such as ground-sill 51 and column 53. As a result, members such as joists 57 and parts can be arranged in the space portion 50. Therefore, the vibration damper 110 can be securely attached to a joint portion between framework members, for example, a joint portion 55 of the ground-sill 51 and the column 53.

The first plate 111 and the second plate 113 were formed of rectangular plates made of steel plates having the same shape.

Therefore, it is possible to ensure strength of the first plate 111 and the second plate 113, thereby securely ensuring anti-seismic performance of the vibration damper 110. Since the first plate 111 and the second plate 113 are made of the same member, it is possible to produce those plates 111, and 113 using one production facility. Since the flat portions 117, and 125 of the first plate 111 and the second plate 125 are formed to have rectangular shapes, it is possible to obtain a joint face 141 with a large area. Therefore, it is possible to further improve the anti-seismic performance by the vibration damper 110.

The space portion 50 constituted by the first clearance W1 and the second clearance W2 has a dimension which is at least sufficient for inserting a joist 57 therein.

Because of such a constitution, the vibration damper 110 can be attached to a joint portion 55 between the ground-sill 51 and the column 53 while avoiding interference with the joist 57 even when the joist 57 is arranged. Therefore, the vibration damper 110 can be securely attached to the joint portion of the framework members, for example, joint portion 55 between the ground-sill 51 and the column 53.

Further, anchor bolts 63 for joining the ground-sill 51 and the foundation in the vicinity of the joint portion 55 can be arranged in the space portion 50.

Therefore, the vibration damper 10 can be attached to a joint portion 55 between the ground-sill 51 and the column 53 while avoiding interference with an anchor bolts 63 even when the anchor bolt 63 is arranged. Therefore, the vibration damper can be attached to the joint portion of the framework members, for example, joint portion 55 between the ground-sill 51 and the column 53.

The vibration dampers 10, 110 according to the present invention can be applied not only to a wooden construction of timber framework structure but also to a wooden construction built by a two-by-four system.

Figure 11:
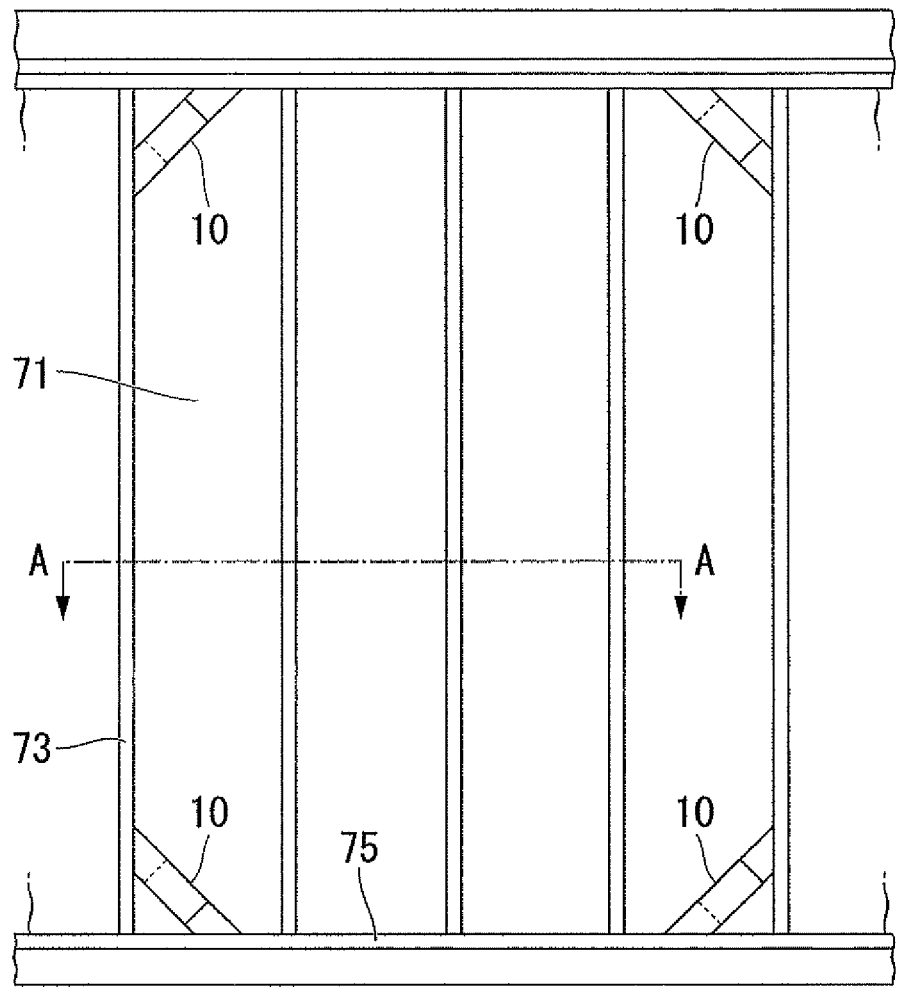
FIG. 11 is a side view showing an example where a vibration damper according to the present invention is applied to a wooden construction built by a wooden two-by-four system (wood frame construction method).
Figure 12:
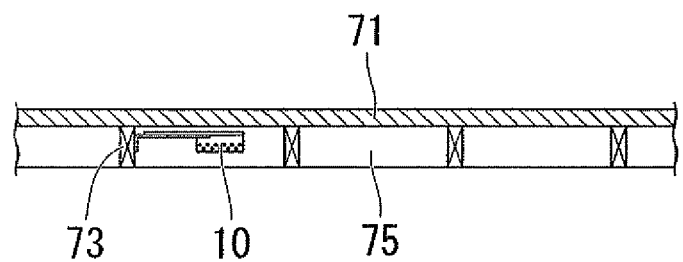
FIG. 12 is a cross sectional view along A-A line of FIG. 11.

Specifically, as shown in FIG. 11 and FIG. 12, the vibration damper 10 (110) is attached so as to reinforce the joint portion of vertical frame 73 and base frame 75, where the panel is attached to side faces of the frames. By this arrangement, anti-seismic performance is improved remarkably. That is, the vibration damper of the present invention exhibit excellent effect also in the wooden construction built by the two-by-four system.

Figure 13:
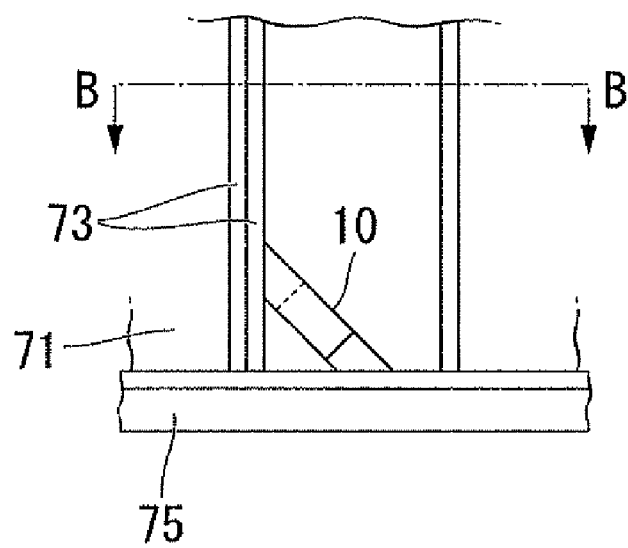
FIG. 13 is a magnified side view showing an example where a vibration damper according to the present invention is applied to a wooden construction built by a wooden two-by-four system.
Figure 14:
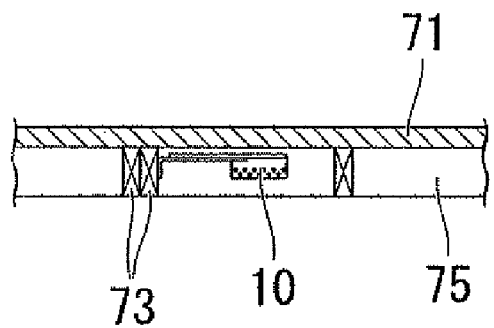
FIG. 14 is a cross sectional view along B-B line of FIG. 11.

Alternatively, as shown in FIGS. 13 and 14 excellent anti-seismic performance can be expected by disposing the vibration damper 10 (110) of the present invention in a framework panel, where the vertical frame 73 is constituted of two timbers.

While the vibration damper 10 of the first embodiment is attached to a wooden construction of two-by-four structure, in the case shown in the above-described FIGS. 11 through 14, a similar effect can be expected by applying the vibration damper 110 of the second embodiment.

EXAMPLES

In the following, an example of using the vibration damper 10 is explained. Where necessary, FIG. 1 to FIG. 4 are referred to in the explanation.

The first plate 11 and the second plate 12 were formed of steel plate made of SS400 having a thickness of 3.2 mm. Each of flat portions 17 and 25 of each plate was formed to have a dimension having a short edge of 240 mm, a long edge of 430 mm, and a height of 92 mm. Fixing portion 21, 29 of each plate was formed to have a dimension of 130 mm×43 mm. Through holes 23, 31 of each plate were formed to have a diameter of 6 mm, and eleven holes (in two lines of 6 holes and five holes) were arranged in equal space in each plate.

The thus formed first plate 11 and the second plate 13 were arranged such that the short edge 43 of the first plate 11 and the short edge 45 of the second plate 13 were flush-fitted, and the long edge 39 of the first plate 11 and the long edge 35 of the second plate 13 are flush-fitted. That is, the joint-face 41 where the first plate 11 and the second plate 13 overlap each other was formed to have a substantially rectangular shape.

Here, the first plate 11 and the second plate 13 were arranged such that the joint face 41 had a dimension of 162 mm×92 mm.

By this constitution, the space portion 50 is formed to have an isoceles right-angle triangle in front view, where the first clearance W1 and the second clearance W2 each had a dimension of 170 mm.

An elastic material 15 made of rubber based material having a thickness of 3 mm was filled in the interstices between the first plate 11 and the second plate 13. In the joint face 41, the elastic material 15 had a dimension of 150 mm×80 mm in front view.

Then the fixing portion 21 of the first plate 11 was fixed to the ground-sill 51, and the fixing portion 29 of the second plate 13 was fixed to the column 53.

At the state at which the vibration damper 10 was disposed to a wooden construction, the wooden construction was subjected to a vibration excitation experiment or the like, and it was confirmed that the vibration damper 10 contributed to improvement of anti-seismic performance.

Next, an example of using the vibration damper 110 is explained. Where necessary, FIG. 7 to FIG. 10 are referred to in the explanation.

The first plate 111 and the second plate 112 were formed of steel plates made of SS400 having a thickness of 3.2 mm. Flat portions 117, 125 of each plate was formed to have a dimension off 125 mm×180 mm. Fixing portions 121, 129 of each plate was formed to have a dimension of 123 mm×131 mm. Through holes 123, 131 of each plates were formed in an arrangement of five holes×two lines.

The thus formed first plate 111 and the second plate 113 were arranged in a state in which one plate was rotated from another plate with a rotation angle of about 90°. The first plate 111 and the second plate 113 were arranged such that the end edge 133 of the first plate 111 on the end opposite to the fixing portion 119 and a side edge 135 of the second plate 113 most apart from the fixing portion 121 were flush-fitted, and the end edge 137 of the second plate 113 on the end opposite to the fixing portion 129 and a side edge 139 of the first plate 111 most apart from the fixing portion 129 were flush-fitted. That is, the joint-face 141 where the first plate 111 and the second plate 113 overlap each other was formed to have a substantially square shape.

By the above-described constitution, a space portion 50 is formed to have dimensions of 55 mm×55 mm in front view. An elastic material 15 made of a rubber-based material having a thickness of 3 mm was filled in the interstices between the first plate 111 and the second plate 113. In the joint face 141, the elastic material 15 had dimensions of 110 mm×110 mm in front view.

Then the fixing portion 121 of the first plate 111 was fixed to the ground-sill 51, and the fixing portion 129 of the second plate 113 was fixed to the column 53.

At the state at which the vibration damper 110 was disposed to a wooden construction, the wooden construction was subjected to a vibration excitation experiment or the like, and it was confirmed that the vibration damper 110 contributed to improvement of anti-seismic performance.

It should be noted that the technical scope of the present invention is not limited to the above-describe embodiment. Various modifications can be made without departing from the spirit or scope of the present invention. Accordingly, the invention is not limited by the specific materials and the constitution described in the embodiments, and allows for modifications.

For example, while the first plate and the second plate were folded in the same direction in the above-described arrangement in the embodiment, the plates may be arranged such that folding directions of the fixing portions are opposite to each other.

While the above-describe embodiments were explained regarding the case in which joist and anchor bolt could be arranged in the space portion, the space portion may have a dimension in which only a joist can be arranged.

While the first embodiment was explained for a case in which the plates were arranged such that the joint face of the first plate and the second plate had a rectangular shape, it is possible to displace the positioning of the first plate and the second plate such that the joint face has a square shape.

While the second embodiment was explained for a case in which the plates were arranged such that the joint face of the first plate and the second plate had a square shape, it is possible to displace the positioning of the first plate and the second plate such that the joint face has a rectangular shape.

INDUSTRIAL APPLICABILITY

According to the present invention, it is possible to provide a vibration damper used in a wooden construction, securely attached to a joint portion where framework members of the wooden construction are joined to each other.

The invention claimed is:
1. A vibration damper disposed in a vicinity of a joint portion in which framework members of a wooden construction are joined to each other, the damper comprising:
 a first plate that is fixed to a first framework member and projects from the framework member,
 a second plate that is fixed to a second framework member and projects from the framework member,
 and an elastic material that is filled in the interstices between the first plate and the second plate and join the first plate and the second plate, wherein
a first clearance is formed between the second framework member and a first fixing portion by which the first plate is fixed to the first framework member;
a second clearance is formed between the first framework member and a second fixing portion by which the second plate is fixed to the second framework member;
the first plate is made of a steel plate that is formed directing from the first fixing portion to the second fixing portion;
the second plate is made of a steel plate that is formed directing from the second fixing portion to the first fixing portion; and
a space portion constituted by the first clearance, the second clearance, the first plate, and the second plate has a dimension which is at least sufficient for inserting a joist therein,
wherein the elastic material is formed of a rubber composition including a base rubber composed of a polymer in which backbone has C—C bond, and added and cross-linked with silica and a silane compound, wherein 100 to 150 parts by mass of silica is added to 100 parts by mass of base rubber, and silane compound is added in a mass equal to 10 to 30% of a mass of the silica,
wherein, in the elastic material,
equivalent viscous damping coefficient Heq satisfies Heq>0.24 under conditions of 0° C. to 40° C., and within a range shear strain $\gamma$ of $0.125 \leq \gamma \leq 3.0$;
a ratio of equivalent shear modulus Geq at $\gamma=3$ and Geq at $\gamma=1$ satisfies $0.40 \leq \{Geq_{(\gamma=3.0)}\}/\{Geq_{(\gamma=1.0)}\} < 0.60$;
a damping capacity of the elastic material under a predetermined temperature has a rate of change of frequency from a base frequency within ±50% where the base frequency is within a range of 0.1 to 20 Hz;
normalized by Geq at 20° C., a ratio between Geq(t=0° C.) at 0° C. and Geq(t=20° C.) at 20° C. satisfies Geq(t=0° C.)/Geq(t=20° C.)$\leq$2.0, and a ratio between Geq(t=40° C.) at 40° C. and Geq(t=20° C.) at 20° C. satisfies Geq (t=40° C.)/Geq(t=20° C.)$\geq$0.5;
a dimension of deformation at the time of marginal deformation satisfies a strain ratio $\geq$400% within a range of 0° C. to 40° C.; and
under aging conditions equivalent to aging of 60 years, aging deterioration of the elastic material evaluated by change of rate of Heq and Geq are within a range of Heq(60 years)/Heq(0 year)>0.8, and Geq(60 years)/Geq(0 year)<1.2.

2. A vibration damper according to claim 1, wherein an anchor bolt used in joining a ground-sill and a foundation in a vicinity of the joint portion can be arranged in the space portion.

3. A vibration damper disposed in a vicinity of a joint portion in which framework members of a wooden construction are joined to each other, the damper comprising
a first plate that is fixed to a first framework member and projects from the framework member,
a second plate that is fixed to a second framework member and projects from the framework member, and
an elastic material that is filled in the interstices between the first plate and the second plate and the first plate and the second plate, wherein
a first clearance is formed between the second framework member and a first fixing portion by which the first plate is fixed to the first framework member,
a second clearance is formed between the first framework member and a second fixing portion by which the second plate is fixed to the second framework member, and
a space constituted of the first clearance, the second clearance, the first plate, and the second plate has a dimension which is at least sufficient for inserting a joist therein,
wherein the elastic material is formed of a rubber composition including a base rubber composed of a polymer in which backbone has C—C bond, and added and cross-linked with silica and a silane compound, wherein 100 to 150 parts by mass of silica is added to 100 parts by mass of base rubber, and silane compound is added in a mass equal to 10 to 30% of a mass of the silica,
wherein, in the elastic material,
equivalent viscous damping coefficient Heq satisfies Heq>0.24 under conditions of 0° C. to 40° C., and within a range shear strain $\gamma$ of $0.125 \leq \gamma \leq 3.0$;
a ratio of equivalent shear modulus Geq at $\gamma=3$ and Geq at $\gamma=1$ satisfies $0.40 \leq \{Geq_{(\gamma=3.0)}\}/\{Geq_{(\gamma=1.0)}\} < 0.60$;
a damping capacity of the elastic material under a predetermined temperature has a rate of change of frequency from a base frequency within ±50% where the base frequency is within a range of 0.1 to 20 Hz;
normalized by Geq at 20° C., a ratio between Geq(t=0° C.) at 0° C. and Geq(t=20° C.) at 20° C. satisfies Geq(t=0° C.)/Geq(t=20° C.), and a ratio between Geq(t=40° C.) at 40° C. and Geq(t=20° C.) at 20° C. satisfies Geq(t=40° C.)/Geq(t=20° C.)$\geq$0.5;
a dimension of deformation at the time of marginal deformation satisfies a strain ratio $\geq$400% within a range of 0° C. to 40° C.; and
under aging conditions equivalent to aging of 60 years, aging deterioration of the elastic material evaluated by change of rate of Heq and Geq are within a range of Heq(60 years)/Heq(0 year)>0.8, and Geq(60 years)/Geq(0 year)<1.2.

4. A vibration damper according to claim 3, wherein the first plate and the second plate are constituted of steel plates having the same rectangular shape.

5. A vibration damper according to claim 3, wherein the vibration damper is constituted such that an anchor bolt used in joining a ground-sill and a foundation in a vicinity of the joint portion can be arranged in the space portion.

6. A vibration damper according to claim 4, wherein the vibration damper is constituted such that an anchor bolt used in joining a ground-sill and a foundation in a vicinity of the joint portion can be arranged in the space portion.

* * * * *